3,488,711
PROCESS FOR IMPREGNATING RED
PHOSPHORUS
Franz-Josef Dany, Hurth, near Cologne, and Wilhelm
Forst, Knapsack, near Cologne, Germany, assignors
to Knapsack Aktiengesellschaft, Knapsack, near Cologne, Germany
No Drawing. Filed May 31, 1967, Ser. No. 642,334
Claims priority, application Germany, Mar. 15, 1967,
K 59,584
Int. Cl. B44d 1/02
U.S. Cl. 117—72         7 Claims

ABSTRACT OF THE DISCLOSURE

Ground red phosphorus stabilized in aqueous suspension with precipitated magnesium hydroxide or aluminum hydroxide is impregnated by treating the phosphorus particles with paraffin, a wax or an organo-silicon compound as a hydrophobic agent, the hydrophobic agent being used in the form of an aqueous dispersion which is added, immediately after precipitation of the metal hydroxide, to an aqueous suspension of the red phosphorus particles and precipitated magnesium hydroxide or aluminum hydroxide.

---

The present invention relates to a process for impregnating red phosphorus by means of paraffin, a wax or an organo-silicon compound.

It is known that pulverulent substances or compositions for pyrotechnical uses can be treated to receive a coating repelling water and affording simultaneously some protection against oxidation under the action of atmospheric oxygen. This is highly desirable especially in the case of red phosphorus where oxidation in a moist atmosphere is accompanied by disproportionation with the resultant formation, inter alia, of phosphine which is a reducing agent impairing organic substances, for example nitro-compounds, that may be present in addition to phosphorus.

Red phosphorus to be impregnated with hydrophobic substances should receive a fairly thin enveloping coating to ensure that the ignition of phosphorus so impregnated or of a pyrotechnical composition containing phosphorus proceeds with the initial reactivity of phosphorus. This requirement is met by the process of the present invention.

For example, paraffin-impregnated phosphorus has been prepared heretofore by the introduction of red phosphorus in a ratio of 9:1 into molten paraffin. As a result of the sensitiveness of phosphorus to abrasion, which increases strongly at temperatures above 30° C., it has been necessary to achieve the impregnation under an inert gas atmosphere. It has more especially been found that relatively fine, pulverulent phosphorus is rather difficult to coat with a uniform paraffin or wax layer because the phosphorus portions first introduced absorb too much paraffin or wax, which means that relatively high temperatures and long stirring periods are necessary in order uniformly to distribute the impregnating agent.

To obviate the disadvantages mentioned above, it has been proposed in German published specification 1,185,-591 to use red phosphorus in the form of particles having a size smaller than 1 mm. and mix it intimately, at room temperature, with solid, finely divided paraffin and/or wax in a ratio by weight of phosphorus to paraffin and/or wax of about 9:1 to about 19:1, to heat the resulting mixture at a temperature slightly above the melting point of the paraffin and/or wax, and ultimately to cool the mixture. A further feature of this process comprises agitating the mixture while heating and/or cooling it.

The mixtures formed of phosphorus and paraffin and/or wax prepared by the above process have been found never to be completely homogeneous despite intensive agitation, which means that the coating applied to the individual phosphorus particles varies in thickness. This impairs the reactivity of the phosphorus particles, as already mentioned above. Furthermore, this conventional process calls for the use of relatively large quantities of hydrophobic agent, which is disadvantageous from a commercial point of view.

It has now been found that a thin coating uniformly thick can be applied to the surface of ground red phosphorus with the use of a minimum quantity of hydrophobic agent and the resultant formation of impregnated red phosphorus of good reactivity.

The present process for impregnating ground red phosphorus stabilized in aqueous suspension with precipitated magnesium hydroxide or aluminum hydroxide, by treatment of the phosphorus particles with paraffin, a wax or an organo-silicon compound as the hydrophobic agents comprises mixing the aqueous suspension of red phosphorus particles and precipitated magnesium hydroxide or aluminum hydroxide, immediately after precipitation of the metal hydroxide, with an aqueous dispersion of about 0.2 to 5.0% by weight of the hydrophobic agent, referred to the quantity of phosphorus used, filtering the mixture obtained, drying the resulting filter cake of impregnated and stabilized red phosphorus at a temperature of about 100 to 135° C., if desired under reduced pressure, and thereby freeing it substantially from water.

It is known and has been reported in literature that red phosphorus can be stabilized by the precipitation of magnesium hydroxide or aluminum hydroxide in an aqueous suspension if red phosphorus particles. To achieve the stabilization, the magnesium hydroxide is preferably used in a proportion of about 0.6% by weight, in the form of MgO and referred to the quantity of red phosphorus to be stabilized, whereas the aluminum hydroxide is used in a proportion of about 1.5 to 2.0% by weight.

The red phosphorus particles suspended in water are impregnated immediately after their stabilization, e.g. with magnesium hydroxide, which is precipitated in the suspension from a magnesium salt with the use, for example, of sodium hydroxide solution. For the impregnation then to follow, the suspension of the phosphorus particles is mixed with an aqueus suspension of the impregnating or hydrophobic agent, which may be paraffin or a wax having a melting point of about 50 to 62° C. or an organo-silicon compound. The aqueous starting suspension preferably contains the hydrophobic agent in a concentration of about 30 to 45% by weight. To be useful, the hydrophobic agent is required to produce stable dispersions in water and to be stable in an aqueous alkaline medium up to a pH-value of about 11.

A special feature of the process of the present invention comprises adding the individual hydrophobic agents useful for impregnating phosphorus in metered quantities within the range of about 0.2 to 5.0% by weight. In the event that organo-silicon compounds, such as silicones, siloxanes or silanes, are used, they should be applied in a proportion of about 0.6 to 1.2% by weight, referred to the quantity of phosphorus to be impregnated. When paraffin or a wax is the impregnating agent, it is necessary to employ about 0.9 to 1.8% by weight thereof to produce sufficient protection against corrosion.

The process of the present invention can be carried out more particularly in the manner described hereinafter.

Yellow phosphorus is transformed in customary manner into red phosphorus, for example by treatment in a heatable ball mill at a temperature of 250 to 350° C. The red phoshorus so produced is cooled and suspended with water in the ball mill. The comminution of the phosphorus is continued by wet grinding until the individual phosphorus particles are found to have the desirable degree of fineness. Thereafter, the material in the ball mill is delivered to a tank provided with a stirrer to destroy small residual portions of untransformed yellow phosphorus, mixed with a proportion of sodium hydroxide solution sufficient to decompose the yellow phosphorus, and boiled for some hours with agitation. To stabilize the phosphorus by means of magnesium hydroxide, the cooled phosphorus suspension, which has a pH-value of about 7, is mixed, with the stirrer running, with a quantity of an aqueous magnesium chloride solution equivalent to a magnesium oxide content of 0.6% by weight, and magnesium hydroxide is ultimately precepitated from the aqueous phase by means of sodium hydroxide solution. In the present process, it is essential that the precipitation of the metal hydroxide be followed immediately by impregnation of the phosphorus by the addition of an aqueous suspension of a suitable hydrophobic agent. The resulting phosphorus suspension is filtered with the help of a vacuum rotation filter and the filter cake, which is formed of stabilized and impregnated phosphorus, is treated in a shelved drier to be freed substantially from adhering moisture. The dried pulverulent red phosphorus may thereafter be classified, if desired. A 10% by weight aqueous suspension of the impregnated red phosphorus was found to have a pH-value of about 9–10 stable for some time. Decreasing pH-values of the suspension are an index of the progressing oxidation of red phosphorus.

The red phosphorus produced by the present process is found to have a stability to oxidation essentially better than that of unimpregnated phosphorus prepared in customary manner. This is demonstrated in the following Table by data obtained in comparative tests indicating the change in the pH-value of a 10% by weight aqueous suspension of red phosphorus stabilized by means of magnesium hydroxide, in the presence or absence of the hydrophobic agent. The magnesium hydroxide was used in a concentration of 0.6% by weight, calculated as MgO and referred to the quantity of phosphorus to be impregnated. In the Table there is also indicated the time at which the hydrophobic agent is added to the aqueous stabilized phophorus suspension, as a further factor influencing the pH-value of the suspension and the change thereof after a given period of time. The tests numbered 2 and 3 illustrate the process of the present invention, wherein the initial pH-value is found to have undergone the slightest decrease after 192 hours,

TABLE

| Test No. | Starting material tested | pH value of an aqueous 10% suspension of material tested, after— | | |
| --- | --- | --- | --- | --- |
| | | 0 hours | 72 hours | 192 hours |
| 1 | Red phosphorus, stabilized with 0.6% by weight MgO, but not impregnated. | 9.9 | 2.7 | 1.8 |
| 2 | Red phosphorus, stabilized with 0.6% by weight MgO and impregnated, immediately after the stabilization, with 4% by weight of a 45% aqueous paraffin emulsion. | 9.7 | 7.5 | 5.85 |
| 3 | Same material as in Test 2, but impregnated with 4% by weight of a 30% silicon resin emulsion. | 9.7 | 7.7 | 5.85 |
| 4 | Same material as in Test 1, but impregnated subsequently with 4% by weight of a 45% paraffin emulsion. | 8.3 | 2.6 | 1.8 |
| 5 | Same material as in Test 1, but impregnated subsequently with 4% by weight of a 30% silicon resin emulsion. | 8.4 | 1.3 | 1.3 |

What is claimed is:
1. In the process for impregnating ground red phosphorus which comprises precipitating a stabilizer of magnesium hydroxide or aluminum hydroxide in an aqueous suspension of ground red phosphorus to thereby coat the phosphorus, treating the phosphorus suspension with a hydrophobic agent, filtering the resulting suspension, and recovering the resulting filter cake; the improvement comprising adding to said aqueous suspension immediately after precipitation of the stabilizer an aqueous dispersion of about 0.2 to 5.0% by weight of a wax or organosilicon compound as the hydrophobic agent, referred to the quantity of phosphorus used.

2. The process of claim 1, wherein the phosphorus is stablized with about 0.6% by weight magnesium hydroxide, calculated as MgO and referred to the quantity of phosphorus used.

3. The process of claim 1, wherein the phosphorus is stabilized by means of about 1.5 to 2.0% by weight aluminum hydroxide.

4. The process of claim 1, wherein the phosphorus is impregnated with about 0.6 to 1.2% by weight of an organo-silicon compound.

5. The process of claim 1 wherein the hydrophobic agent is paraffin.

6. The process of claim 1 wherein about .9–1.8% by weight of hydrophobic agent is utilized.

7. The process of claim 1 wherein said aqueous suspension contains the hydrophobic agent in a concentration of about 30 to 45% by weight.

References Cited

UNITED STATES PATENTS

| 2,359,243 | 9/1944 | Pernert | 117—100 X |
| 2,399,120 | 4/1946 | Hurd | 117—100 X |
| 2,574,466 | 11/1951 | Clay et al. | 49—29 X |
| 2,645,571 | 7/1953 | Silverstein | 23—223 X |
| 2,658,874 | 11/1953 | Clay et al. | 149—29 X |
| 2,717,246 | 9/1955 | Kienle et al. | 106—308 X |
| 3,192,031 | 6/1965 | Zaayenga | 117—168 X |

WILLIAM D. MARTIN, Primary Examiner

MATHEW R. P. PERRONE, Jr., Assistant Examiner

U.S. Cl. X.R.

23—223; 117—92, 100; 149—6, 29